April 19, 1960
H. TIDWELL
2,933,209
DUMP TRUCK ENDGATE AND LOADING DEVICE
Filed Oct. 16, 1957
4 Sheets-Sheet 1
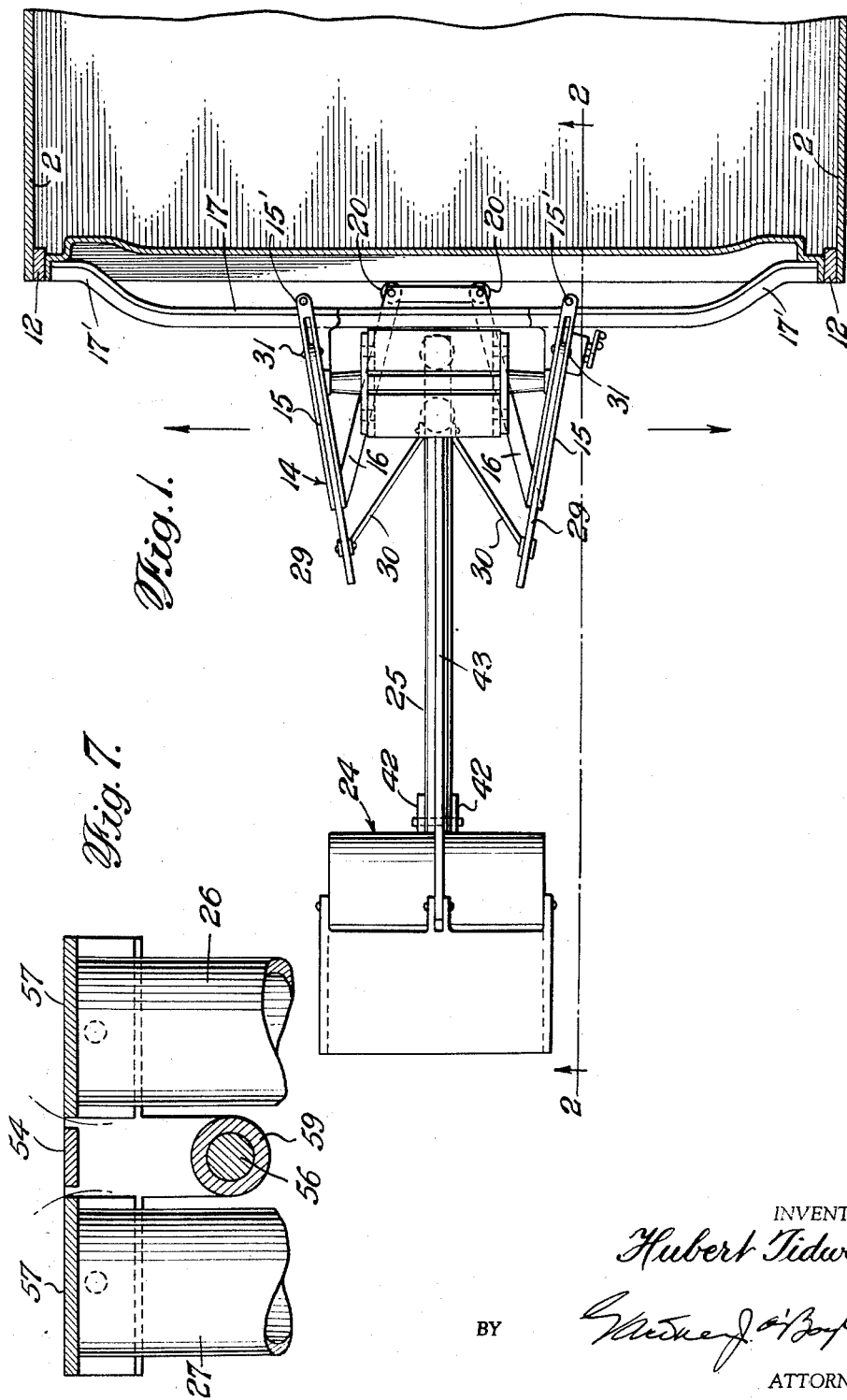
INVENTOR
Hubert Tidwell
BY
ATTORNEY April 19, 1960     H. TIDWELL     2,933,209
DUMP TRUCK ENDGATE AND LOADING DEVICE
Filed Oct. 16, 1957     4 Sheets-Sheet 2
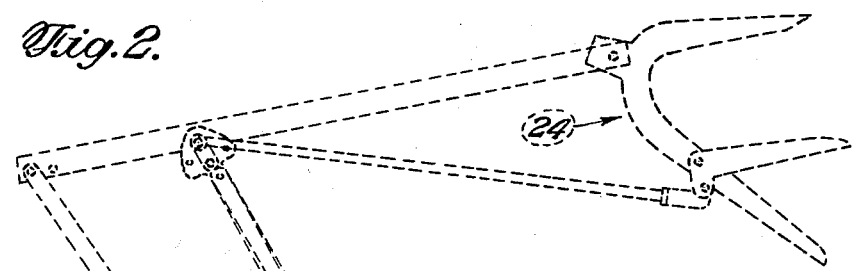
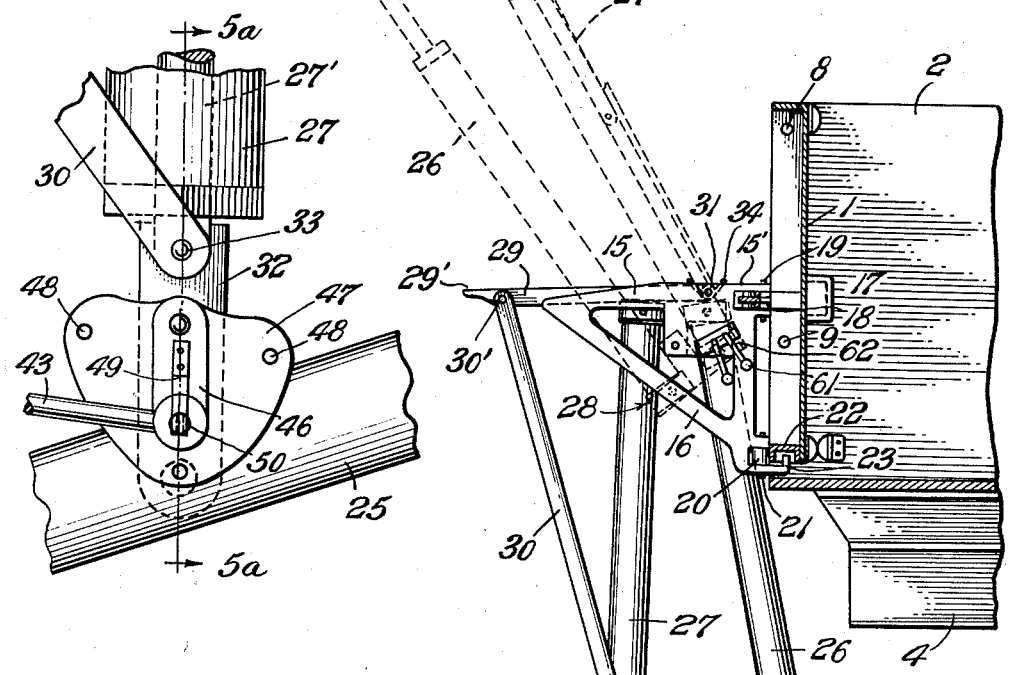
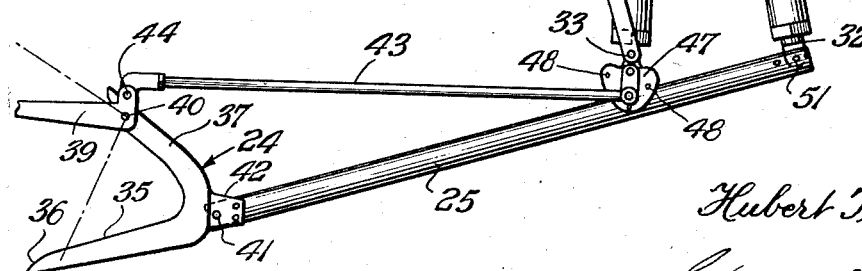
INVENTOR
Hubert Tidwell,
BY
ATTORNEY

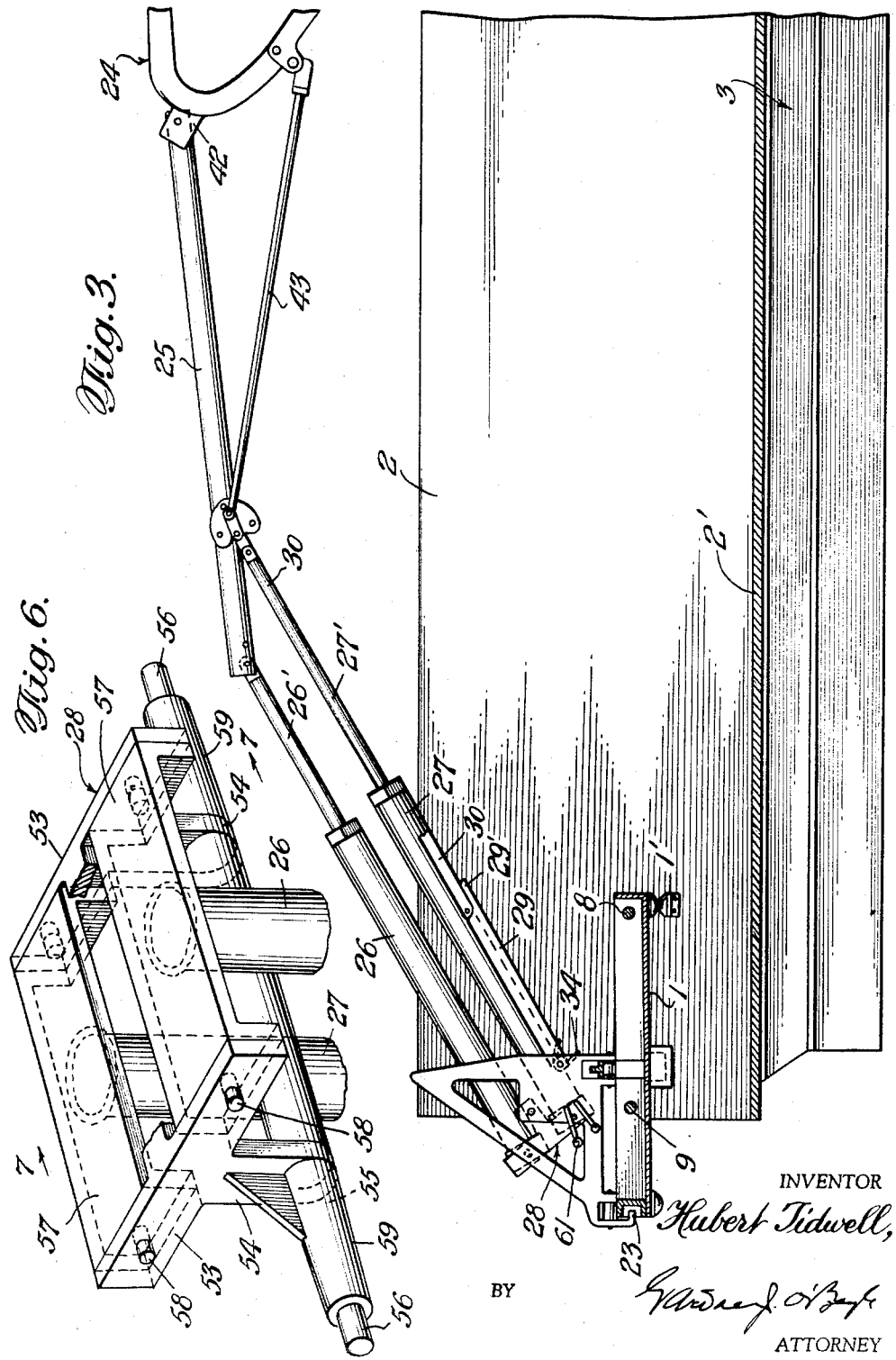

April 19, 1960 H. TIDWELL 2,933,209
DUMP TRUCK ENDGATE AND LOADING DEVICE
Filed Oct. 16, 1957 4 Sheets-Sheet 4
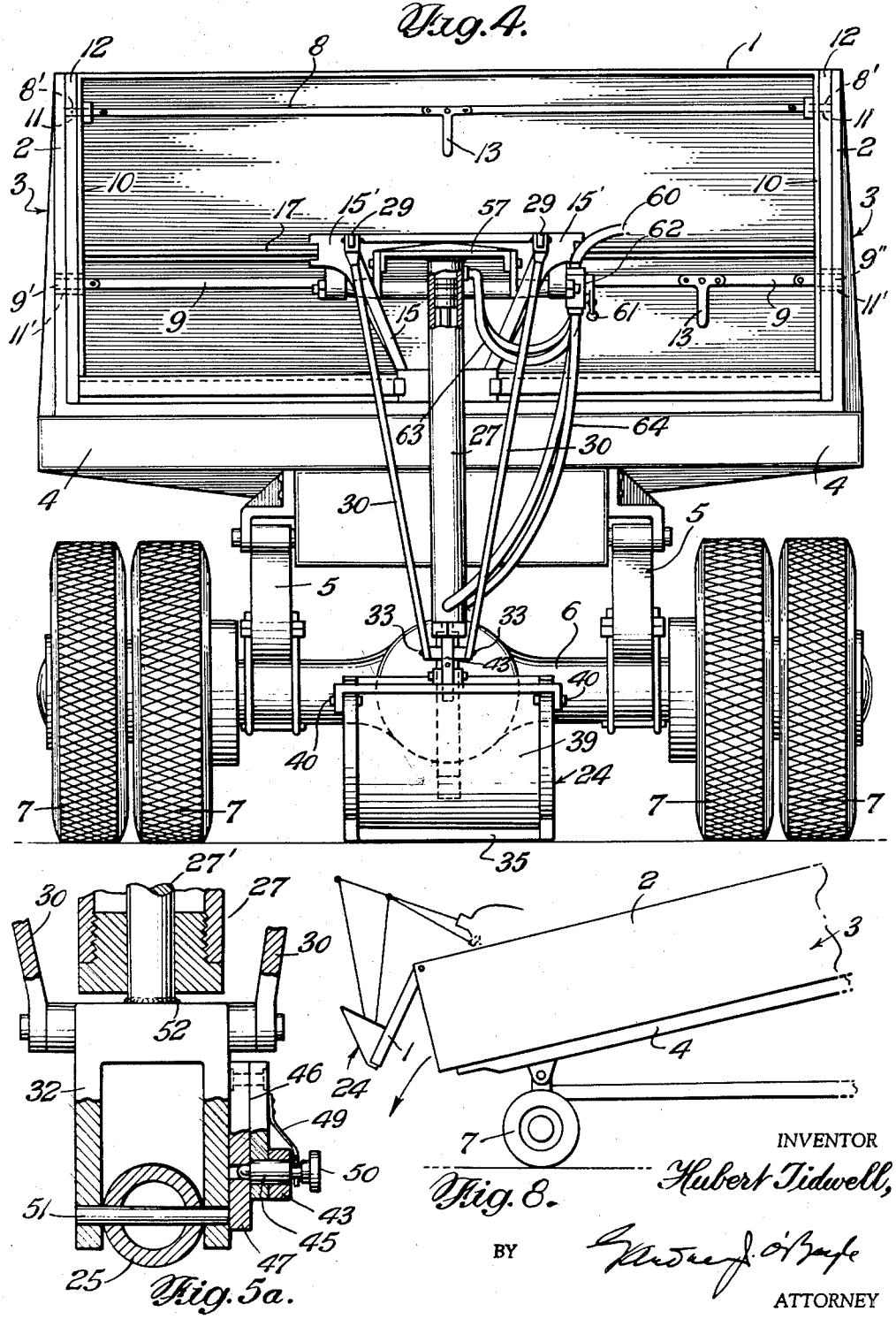
INVENTOR
Hubert Tidwell,
BY
ATTORNEY

United States Patent Office 2,933,209
Patented Apr. 19, 1960

2,933,209

DUMP TRUCK ENDGATE AND LOADING DEVICE

Hubert Tidwell, Salt Lake City, Utah

Application October 16, 1957, Serial No. 690,518

9 Claims. (Cl. 214—78)

My invention relates to a mechanical loader for handling earth composites such as dirt, sand, gravel and the like, and more particularly to a loading device adapted for use with dump trucks and other load carrying vehicles.

The improved loading arrangement of the present invention is comprised essentially of a scoop, a scoop boom, a pair of hydraulic jacks for actuating the boom and attached scoop, a frame to support the jacks and associated linkage, and a specially designed truck endgate upon which the frame is mounted.

As will be described more fully hereinafter, the truck endgate, which carries the loading device, is pivotally mounted on the sides of the truck body in such manner that it may, under certain desired loading conditions, be selectively fixed in a vertical positon, or released so as to permit it to rotate inwardly of the truck body and assume a horizontal position with respect to the plane of the floor of the truck. The construction and arrangement of the endgate is one of the important features of the invention for the reason that it permits uniform distribution of the load, during the loading operation, longitudinally of the truck. For example, during loading of the forward portion of the truck, the endgate is released from its normally fixed vertical position, and is permitted to turn inwardly, thus carrying the scoop with it beyond the extreme unloading position it would reach when the gate is in the vertical position, that is to say, its position when the rear portion of the truck is being loaded.

In accordance with the present invention, control of the scoop movements, in a forward or backward direction or upwardly in a circular path from loading to unloading positon, is effected by the operator through the medium of suitable valve levers, located in the vicinity of the central pivot point of the loader, and adapted to control the flow of fluid to the scoop actuating jacks. Sideways movement of the loader is accomplished by manually sliding the loader support frame along a trackway attached to the endgate, whereby a comparatively wide angle of approach of the scoop to the material to be loaded is provided. Additionally, by reason of the improved endgate construction, a portion of the circular movement of the loader, namely, after it has reached a position slightly beyond the vertical, is accomplished by gravity, since by being free to rotate about its axis, the endgate carries the entire assembly with it as the gate turns inwardly of the truck body.

As indicated hereinabove, the release of the endgate for pivotal movement so as to extend the scope of the forward movement of the scoop is only effected at the time of loading the front portion of the truck, the gate being locked in the upright or perpendicular position for rear portion loading. Suitable stops in the form of rubber bumpers are provided on opposite sides of the truck bed and at corners of the endgate, the stops being arranged so that contact between pairs of stops at the bottom of the gate and lower sides of the truck bed is obtained when the gate is in the vertical portion, and the other pairs are in contact when the gate moves inwardly to the horizontal position. By reversing the direction of movement of the jack pistons when the scoop passes the neutral position and the gate starts to move inwardly, the force of gravity is retarded according to the speed of the reaction of the jacks, thus minimizing the possibility of undue shock when the gate pivots to horizontal position. With proper manipulation of the control levers to cause simultaneous inward or outward movement of the jack pistons, or movement of one piston inwardly and the other outwardly in unison or in sequence, the inward rotative movement of the gate may be checked or completely stopped at any desired point of its travel, after passing through the neutral position.

Rotative movement of the scoop is effected primarily by the front or central jack, and its movement inwardly or outwardly or up and down, in conjunction with the rotative movement, is by means of a second jack having its piston pivotally attached to the boom at a point in the vicinity of the rear end thereof. Pivotally attached to the piston of the front jacks, in the vicinity of its outer end, is a pair of linked converging arms which function as braces for the structural framework and as a leverage for creating rotative movement of the scoop assembly about its pivotal axis with respect to the frame carried by the endgate. The construction and arrangement of the arms is such that the leverage thereof decreases as the scoop approaches its dumping position. A dump control arrangement for the scoop is also provided, which control is designed to change the position of the lip of the scoop as the dumping position is reached.

An object of my invention is to provide an improved mechanical loader adapted for use with dump trucks and other load carrying vehicles.

Another object of my invention is to provide an improved loading device adapted to be mounted on an endgate of a dump truck or other load carrying vehicle.

Yet another object of my invention is to provide an improved dump truck endgate construction designed to support a mechanical loader in such manner that the loader assembly may be moved transversely of the gate and also rotated upwardly about its pivotal support means attached to the endgate.

Still another object of my invention is to provide an improved mechanical loader constructed and arranged for rotative movement about an endgate of a dump truck, the endgate being designed to permit pivotal movement thereof inwardly of the dump truck body whereby to facilitate distribution of the load longitudinally of the body of the truck.

A further object of my invention is to provide an improved endgate for dump trucks adapted to support a mechanical loader assembly thereon, wherein the gate may be optionally locked in a vertical position or permitted to pivot inwardly of the truck body to a horizontal position, whereby to increase the scope of movement of the loader during the loading operation.

A still further object of my invention is to provide a mechanical loader including an improved scoop or shovel having adjustable lip portion, whereby the angularity of the lip with respect to plane of the bottom of the scoop may be varied according to desired loading conditions.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particuluar constructions, which for the purpose of explanation, have been made the subject of illustration.

In the drawings:

Figure 1 is a plan view of the loading device of the present invention mounted on the endgate of a truck body.

Fig. 2 is a sectional view taken on line 2—2 of Fig. 1 showing the loader in loading position in full lines and in a delivery position in dotted lines.

Fig. 3 is a view similar to Fig. 2, showing another delivery position of the loader with the endgate rotated about its pivot to a horizontal position.

Fig. 4 is a rear elevational view of the parts shown in Fig. 2.

Fig. 5 is a detail view showing the connecting means between the scoop boom and the front hydraulic jack.

Fig. 5a is a detail sectional view on line 5a—5a of Fig. 5.

Fig. 6 is a detail perspective view of the mounting arrangement of the hydraulic jacks.

Fig. 7 is a detail sectional view on line 7—7 of Fig. 6; and

Fig. 8 is a schematic view showing the truck in the dumping position.

Referring to the drawings, and more particularly, to Figs. 1-4, the truck endgate 1, which carries the loading assembly, is pivotally mounted on the sides 2 of a dump truck or other load carrying vehicle, designated generally by numeral 3, having a conventional chassis frame 4, supported in the usual manner on springs 5, mounted on the rear axle 6, provided with apposed pairs of drive wheels 7. In connection with the pivotal mounting of the endgate, it will be noted that two transverse rods 8 and 9 are provided, said rods having end portions 8' and 9' extending through the side members 10 of the endgate, and adapted to seat in aligned openings 11 and 11', respectively, formed in vertical studs or inserts 12, secured to the side members 2 of the truck body. Each of the rods is provided with actuating means, designated generally by numeral 13, constructed and arranged whereby, under certain operating conditions, the end portions of the rods may be alternatively withdrawn from seated position in the aligned openings of the truck side members, in order to permit inward or outward pivotal movement of the gate, as desired.

The above described pivotal arrangement of the endgate is one of the important features of the present invention, since it not only enables the load to be distributed uniformly, during loading operations, longitudinally of the truck body, but also facilitates unloading, when the truck body is brought to the dumping position. For example, when loading the rear portion of the truck, the end portions of both rods 8 and 9 are seated in the recesses formed in the studs 12, thus maintaining the endgate in the vertical position as shown in Fig. 2; when loading the forward portion of the truck, the ends of the upper rod are withdrawn, to permit inward pivotal movement of the endgate to a horizontal position about the axis formed by rod 9, as shown in Fig. 3; and when the truck body is brought to dumping position, as shown in Fig. 8, the end portions of rod 9 are released, the gate then being free to pivot outwardly about the axis formed by the upper rod 8.

The loader assembly is mounted on the endgate by means of a frame construction, designated generally by numeral 14 (Fig. 1) comprising a pair of upper arms 15 and a pair of lower arms 16, each of said lower arms being angularly disposed vertically downward and horizontally inward with respect to its corresponding upper arm, as shown. The inboard portions 15' of the upper arms are bifurcated to receive a trackway 17 secured to the gate, the arms being retained on the trackway by means of rollers 18 having axles 19 seated in openings formed in the vicinity of the ends of the bifurcated portions of the arms. The lower arms 16 of the bracket or frame member 14 are provided with rollers 20 having axles 21, the rollers being adapted for rolling contact with a flanged member 22 secured to the bottom portion of the endgate, the arms being restrained against outward movement by means of hook portions 23 (Fig. 2) seated within the flanges.

By means of the above described construction and arrangement of the endgate, and of the frame upon which the loader assembly is mounted, it will be seen that the endgate may be selectively retained in the vertical position, or released for pivotal movement about either of the axes defined by the rods 8 and 9, and that the frame may be moved transversely of the endgate along the trackway 17. In this connection it will be noted that the end portions of the trackway are curved inwardly as at 17', whereby a comparatively wide angle of approach of the scoop member to the material to be loaded is provided.

Referring to Figs. 2 and 3, the loader assembly comprises a scoop 24, a boom member 25, a pair of hydraulic jacks 26 and 27 for actuating the boom and the scoop, a generally T-shaped jack supporting frame 28, pivotally mounted on the loader assembly supporting frame 14, and a linkage arrangement comprising pairs of articulated arms 29 and 30, pivotally connected to the upper arms 15 of frame 14 as at 31 (Fig. 1) and to a fitting 32, secured to the piston 27' of jack 27 as at 33, respectively. As will be seen in Figs. 1 and 2, the upper arms 15 are recessed to receive and support the arms 29 during movement of the scoop to effect loading thereof, and also during initial movement of the loaded scoop in its circular path, that is to say, from loading position until it reaches a horizontal position in its path of travel to an unloading position. The arms 29 are spring biased about their pivots 31, in the direction of the recessed portions of the arms 15, by means of suitable springs 34, and accordingly, when the scoop reaches a horizontal position in its travel to an unloading position, extensions 29' of arms 29 overlap the end portions of their associated arms 30, thus providing rigid braces for the structural framework, and as a leverage for creating the rotative movement of the scoop assembly during the loading operation.

The scoop member 24 (Figs. 2 and 4) comprises a bottom 35, formed with a tapered front edge 36, a curvilinear back portion 37, with open sides 38, and a flap or lip member 39, pivotally mounted as at 40, at opposite sides of the back member 37, in the vicinity of the top thereof. The scoop is pivotally mounted at one end of the boom 25 by means of a suitable bolt or pin 41 insertable through openings formed in the boom and in ears 42, which may be formed integral with the scoop. As shown in Fig. 2, three sets of openings are provided for the reception of the pin 41, whereby the position of the pivotal axis of the scoop with respect to the boom may be varied. Actuation of the flap or lip member 39 of the scoop is by means of a tie rod 43, having one end pivotally connected to the flap as at 44, the opposite end of the rod being pivotally attached, through the medium of a pin 45 and link 46, to a plate member 47, secured to the fitting 32. Referring to Figs. 5 and 5a, the plate 47, which is generally heart shaped, is provided with a series of peripherally spaced openings 48 forming seats for the reduced end of the pin 45, which is spring biased into seated position by means of a strip of spring material 49. The strip (Fig. 5a) has one end attached to the link 46, the free end thereof being slotted and adapted to embrace a reduced portion formed in the pin between its main body portion and head or cap 50, the cap providing means by which the pin may be unseated, against the tension of spring 49, and moved to a selected opening 48 of the plate 47.

It will thus be seen that the angularity of the flap or lip member 39, with respect to the bottom of the scoop may be varied by seating the pin 45 in a selected opening 48 of the plate 47. Under certain loading conditions, for example, when it is desired to distribute the load forwardly of the truck body, the flap will be moved to the position shown in full lines in Fig. 2, and when loading the rear portion of the truck, the flap may be raised to the dotted line position. The scoop may also be used in clearing or leveling operations by lowering the flap so that the free end thereof rests on the bottom of the scoop, as illustrated in the dotted line position of Fig. 2.

Referring to Fig. 5a it will be noted that the boom 25 is of tubular construction, preferably a length of metal pipe of sufficient wall thickness to provide ample support for the loads carried by the scoop, and to resist bending under the forces exerted thereon during movement of the loader assembly from loading to unloading position. The fitting 32 is bifurcated, and adapted to receive the boom, as shown, the boom being pivotally mounted within the bifurcated portion by means of a pin 51. It will be further noted that the fitting 32 is rigidly secured to the bottom of piston 27' of the jack 27, for example, by welding, as at 52. The plate 47, may also be secured to the fitting by welding or by other suitable fastening means.

The jack supporting frame 28 (Fig. 6) which is generally T-shaped, comprises end pieces 53, having integral depending members 54 located centrally thereof, said members being secured to a shaft 55 in spaced relation longitudinally of the shaft, the end portions 56 of the shaft being adapted to seat in aligned openings formed in the arms 15 of the loader assembly support frame 14. Between the spaced ends 53, two platforms 57, which carry the jacks 26 and 27, are pivotally mounted by means of pins or stub shafts 58 secured to the platforms, and adapted to seat in openings formed in the end pieces. Suitable sleeves 59 and 59' are fitted over the portions of the shaft exterior of members 54, and between these members respectively, the inner ends of the sleeves being secured to the members 54. The bottoms of jacks 26 and 27 may be secured to the under surfaces of the platforms 57 by welding, and suitable reinforcing 54' may be used between the members 54 and sleeves 59, as shown. The purpose of the above described construction and arrangement of the jack supporting frame is to permit required pivotal movement of the frame with respect to its support, during the loading operation, and also to enable each jack to pivot about its axis of support in the frame, as the loading assembly moves from loading position to unloading position, and vice versa.

The hydraulic jacks 26 and 27, which are of conventional construction, may be connected to a suitable source fluid, not shown, by means of flexible tubing 60 (Fig. 4), actuation of the jacks, that is to say, movement of the jack pistons 26' and 27' with respect to the jack cylinders or housings, being controlled by means of levers 61 of valve devices 62, which are operatively connected between the main fluid supply line 60, and the auxiliary feed lines 63 and 64 leading to opposite ends of the jack cylinders. It is contemplated that when the loader of the present invention is used with a dump truck of the character illustrated herein, the fluid required for the operation of the jacks will be obtained from the hydraulic system of the truck. It will also be understood that for mine use, air jacks may be substituted for the hydraulic jacks 26 and 27.

With reference to the mounting arrangement of the boom 25, and more particularly the method of pivotally connecting the pistons of the jacks thereto, as explained hereinabove, the boom is of cylindrical shape, and accordingly, it is readily adaptable to the use of the bifurcated fittings 32, which may be conveniently pinned to the boom at selected points and permit desired pivotal movement between the fittings and the boom.

In the operation of the loader, assuming that the forward part to the truck is to be loaded, the tailgate then being in the vertical position shown in Fig. 2, the operator, who stands on the ground at the side of the loader and within easy reach of the jack control levers, checks the position of the scoop, that is to say, its alignment with respect to the material to be loaded, and if adjustment of the angle of approach of the scoop is required, sideways movement of the assembly is accomplished by manually sliding the frame 14 along the trackway 17 of the endgate to the desired position. After the angle of approach has been checked, control of the scoop movements, in a forward or backward direction or upwardly in a circular path from loading to unloading position is effected by the operator through the medium of the valve levers 61 associated with the valves which control the flow of fluid to the jacks 26 and 27. Movement of the scoop in an upward or downward direction or upwardly in a circular path is effected by the operator by suitable manipulation of the valve levers 61 associated with the valves which control the flow of fluid to the jacks 26 and 27. When the levers 61 of the valves 62 are suitably manipulated to cause simultaneous inward or outward movement of the jack pistons 26' and 27', or movement of one piston inwardly and the other outwardly, either in unison or in sequence, the scoop moves forwardly into and upwardly through the material to be loaded, the loaded scoop then being carried upwardly in a circular path, as shown in the dotted line positions of the elements in Fig. 2. As explained hereinabove, when the scoop reaches a horizontal position in its path of travel, the projections 29' of the arms 29 overlap the end portions of arm 30 in the vicinity of their pivotal points 30', thus forming rigid braces which function as supports for the framework, and as leverage for creating rotative movement of the scoop assembly. This leverage decreases as the scoop approaches its dumping position, and at approximately the same position the scoop dump control arrangement is actuated to change the angularity of the lip of the scoop, thus regulating its pitch for dumping. Continued rotative movement of the assembly beyond the position shown in dotted lines (Fig. 2) brings the scoop to dumping position, and after the material has been dumped, the scoop is returned to its initial position shown in the full lines of Fig. 2. The above described cycle is repeated until the rear portion of the truck is completely loaded.

The operation of the loader when loading the forward part of the truck is substantially the same as above described, except that the endgate is released from its fixed vertical position, as shown in Fig. 2, so that it is free to pivot about the rod 9, from its initial vertical position to the horizontal position shown in Fig. 3. Release of the endgate for pivotal movement so as to extend the scope of the forward movement of the scoop is effected by actuating the latch mechanism 13, associated with the rod 8 to withdraw the ends 8' of the rod from seated positions in members 12. The gate is then free to rotate inwardly of the truck body, after the scoop passes the vertical position in its path of travel, and the gate assumes a horizontal position with respect to the plane of the floor 2' of the truck, the inner end of the gate then resting on the stops 1' attached to the lower sides of the truck bed. By reversing the direction of movement of the jack pistons when the scoop passes the neutral position and as the gate begins to move inwardly of the truck, the force of gravity is retarded according to the speed of reaction of the jacks, thus minimizing the possibility of undue shock when the gate pivots to the horizontal position. By proper manipulation of the valve control levers 61, as described in connection with the loading of the rear portion of the truck, the inward movement of the gate may be checked or completely stopped at any desired point of its travel, after the loader assembly passes the neutral position.

The above described pivotal arrangement of the endgate enables the load to be distributed uniformly of the truck body during the loading operations, and it also facilitates unloading, when the truck body is brought to the dumping position, as shown schematically in Fig. 8. When it is desired to dump the contents of the truck, the endgate is brought to the vertical position, and the ends of rod 8 are moved to seated positions in members 12. The ends of rod 9 are then released from their seated positions in members 12, and the gate is free to swing outwardly about rod 8 as an axis, thus permitting the material to be discharged as the truck body moves upwardly to the dumping position.

It will be appreciated that while the loaded truck is being moved to the location at which the material is to be dumped, that the loader assembly may be moved to such position that the scoop will rest on the load. If the truck, when loaded or empty, is to be moved an appreciable distance along a highway or over uneven terrain, the loader assembly may be retained in transport position by means of chains or cables, not shown, secured to the truck body.

While the loader of the present invention has been described in connection with the loading of dump trucks, it will be understood that the invention comprehends use of the loader with other types of hauling vehicles, and under a different environment than that which obtains with conventional surface loading of trucks. For example, the loader is particularly well adapted for use in connection with the moving of ore from the face of a mine to the outside or surface. This type of loading is presently accomplished by hand shoveling, and up to 3 feet, or more of waste material has to be shot down and hauled to an outside dump, in order to provide the necessary head room for the conventional heavy mechanical loaders now in use. The improved loader of the present invention is suitable for use with low ceilings of the type encountered in mining and handling uranium ore, where the veins are usually less than six feet thick. The device is of comparatively light weight, economical to produce, and is characterized by low maintenance and operating costs. In addition to adaptability for use in leveling off dump piles and in like clearing operations, the loader in the larger sizes, when mounted on the rear of a truck, can be used to dig into the earth below wheel level, as when excavating basements or the like.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. In a dump truck, including a truck body having sides and a floor, an improved endgate adapted to operatively support a truck loading device thereon, said gate being positioned between the sides of the truck and extending upwardly from the floor to the tops of the truck sides, means for supporting the gate for pivotal movement with respect to the truck body comprising a bipartite rod carried by the gate, said bipartite rod being positioned below the transverse center line of the gate and having its ends normally seated in aligned recesses formed in the side members of the truck, means for supporting the gate for pivotal movement outwardly of the truck body comprising a second bipartite rod carried by the gate, said second rod being positioned in the vicinity of the top of the gate and having its ends normally seated in aligned recesses formed in the truck side members, means operatively associated with each of said bipartite rods for moving the rod ends into or out of seated positions with respect to the recesses, whereby the gate may be selectively released for pivotal movement about either of the rods, a trackway secured to the rear face of the gate and extending transversely thereof, a truck loader supporting frame rollably mounted on said trackway, and a loader assembly support member pivotally mounted on said loader supporting frame.

2. In a dump truck, including a truck body having sides and a floor, an improved endgate adapted to operatively support a truck loading device thereon, said gate being positioned between the sides of the truck and extending upwardly from the floor to the tops of the truck sides, means for supporting the gate for pivotal movement inwardly of the truck body comprising a bipartite rod carried by the gate, said bipartite rod being positioned below the transverse center line of the gate and having its ends normally seated in aligned recesses formed in the side members of the truck, means for supporting the gate for pivotal movement outwardly of the truck body comprising a second bipartite rod carried by the gate, said second rod being positioned in the vicinity of the top of the gate and having its ends normally seated in aligned recesses formed in the truck side members, means operatively associated with each of said bipartite rods for moving the rod ends into or out of seated positions with respect to the recesses, whereby the gate may be selectively released for pivotal movement about either of the rods, a trackway secured to the rear face of the gate and extending transversely thereof, a truck loader supporting frame rollably mounted on said trackway, and a loader assembly comprising a scoop, a scoop boom and a pair of jacks for actuating the boom and the scoop, pivotally mounted on said loader supporting frame.

3. An improved loader, comprising, in combination, a support for the loader constructed and arranged to be selectively released for pivotal movement about one of a pair of pivot axes, means for selectively releasing the support for pivotal movement about one or the other of the axes, a trackway mounted on the support and extending transversely thereof, a loader supporting frame rollably mounted for transverse movement with respect to said trackway, a pair of jacks, including jack pistons, pivotally mounted on said support frame, a scoop boom pivotally attached at one end to the end of one of the jack pistons, a scoop pivotally attached to the opposite end of the boom, the piston of the other jack being pivotally attached to the boom between the boom ends, a source of power to actuate the jacks, means associated with each jack for controlling inward and outward movement of the jack piston, whereby upon suitable manipulation of the control means the scoop moves outwardly to loading position and then upwardly in a circular path to unloading position.

4. An improved loader, comprising, in combination, a support for the loader constructed and arranged to be selectively released for pivotal movement about one of a pair of pivot axes, means for selectively releasing the support for pivotal movement about one axis, a frame rollably mounted for transverse movement with respect to said support, a pair of jacks, including jack pistons, pivotally mounted on said support frame, a scoop boom pivotally attached at one end to the end of one of the jack pistons, an open-ended scoop pivotally mounted at the opposite end of the boom, the piston of the other jack being pivotally attached to the boom between the boom ends, said scoop having a bottom member, a curvilinear back portion extending upwardly and forwardly of the bottom member, and a top flap pivotally mounted at the front of said back portion, a tie rod having one end pivotally secured to the flap, the opposite end of the rod being pivotally mounted in the vicinity of the end of the jack piston attached to the boom between the boom ends, a source of power to actuate the jacks, means associated with each jack for controlling inward and outward movement of the jack piston, whereby upon suitable manipulation of the control means the scoop moves outwardly to loading position and then upwardly in circular path to unloading position.

5. An improved loader, comprising, in combination, a support for the loader constructed and arranged to be selectively released for pivotal movement about one of a pair of pivot axes, means for selectively releasing the support for pivotal movement about one axis, a trackway mounted on the support and extending transversely thereof, a frame rollably mounted for transverse movement with respect to said trackway, a pair of jacks, including jack pistons, pivotally mounted on said support frame, a scoop boom pivotally attached at one end to the end of one of the jack pistons, an open-sided scoop pivotally mounted at the opposite end of the boom, the piston of the other jack being pivotally attached to the boom between the boom ends, said scoop having a bottom member, a curvilinear back portion extending upwardly and forwardly of the bottom member, and a top flap pivotally mounted at the front of said back portion, a tie rod having one end pivotally secured to the flap, the opposite end of the rod being pivotally mounted in the vicinity of the end of the jack piston attached to the boom between the boom ends, a source of power to actuate the jacks, and means associated with each jack for controlling inward and outward movement of the jack piston, whereby upon suitable manipulation of the control means the scoop moves outwardly to loading position and then upwardly in a circular path to unloading position.

6. An improved loader, comprising, in combination, a support for the loader constructed and arranged to be selectively released for pivotal movement about one of a pair of pivot axes, means for selectively releasing the support for pivotal movement about one axis, a frame rollably mounted for transverse movement with respect to said support, a pair of jacks, including jack pistons, pivotally mounted on said support frame, a scoop boom pivotally attached at one end to the end of one of the jack pistons, an open-ended scoop pivotally mounted at the opposite end of the boom, the piston of the other jack being pivotally attached to the boom between the boom ends, said scoop having a bottom member, a curvilinear back portion extending upwardly and forwardly of the bottom member, and a top flap pivotally mounted at the front of said back portion, a tie rod having one end pivotally secured to the flap, the opposite end of the rod being pivotally mounted in the vicinity of the end of the jack piston attached to the boom between the boom ends, a linkage comprising a pair of articulated arms pivotally connected to the rollably mounted frame at opposite sides thereof and to the piston of the jack attached to the boom between the boom ends, a source of power to actuate the jacks, and means associated with each jack for controlling inward and outward movement of the jack piston, whereby upon suitable manipulation of the control means the scoop moves outwardly to loading position and then upwardly in a circular path to unloading position.

7. An improved loader for use with dump trucks and other hauling vehicles having an endgate, comprising, in combination, a loader support frame rollably mounted on the endgate and adapted for transverse movement with respect thereto, said endgate being constructed and arranged to be selectively released for pivotal movement about one of a pair of pivot axes, means for selectively releasing the endgate for pivotal movement about one or the other of the axes, a pair of jacks, including jack pistons, pivotally mounted on said support frame, a scoop boom pivotally attached at one end to the end of one of the jack pistons, and open-ended scoop pivotally mounted at the opposite end of the boom, the piston of the other jack being pivotally attached to the boom between the boom ends, said scoop having a bottom member, a curvilinear back portion extending upwardly and forwardly of the bottom member, and a top flap pivotally mounted at the front of said back portion, a tie rod having one end pivotally secured to the flap, the opposite end of the rod being pivotally mounted in the vicinity of the end of the jack piston attached to the boom between the boom ends, a source of power to actuate the jacks, and means associated with each jack for controlling inward and outward movement of the jack piston, whereby upon suitable manipulation of the control means the scoop moves outwardly to loading position and then upwardly in a circular path to unloading position.

8. In a dump truck, including a truck body having sides and a floor, an endgate adapted to operatively support a truck loading device thereon, said gate being positioned between the sides of the truck and extending upwardly from the floor to the tops of the truck sides, means for selectively supporting the gate for pivotal movement inwardly of the truck body or outwardly thereof, a trackway secured to the rear face of the gate and extending transversely thereof, a truck loader supporting frame rollably mounted on said trackway, a loader assembly pivotally mounted on the truck loader supporting frame, comprising a pair of jacks, including jack pistons, pivotally mounted on said support frame, a scoop boom pivotally attached at one end to the end of one of the jack pistons, an open-ended scoop pivotally mounted at the opposite end of the boom, the piston of the other jack being pivotally attached to the boom between the boom ends, said scoop having a bottom member, a curvilinear back portion extending upwardly and forwardly of the bottom member, and a top flap pivotally mounted at the front of said back portion, a tie rod having one end pivotally secured to the flap, the opposite end of the rod being pivotally mounted in the vicinity of the end of the jack piston attached to the boom between the boom ends, a source of power to actuate the jacks, and means associated with each jack for controlling inward and outward movement of the jack piston, whereby upon suitable manipulation of the control means the scoop moves outwardly to loading position and then upwardly in a circular path to unloading position.

9. In a dump truck, including a truck body having sides and a floor, an endgate adapted to operatively support a truck loading device thereon, said gate being positioned between the sides of the truck and extending upwardly from the floor to the tops of the truck sides, means for supporting the gate for pivotal movement inwardly of the truck body comprising a bipartite rod carried by the gate, said bipartite rod being positioned below the transverse center line of the gate and having its ends normally seated in aligned recesses formed in the side members of the truck, means for supporting the gate for pivotal movement outwardly of the truck body comprising a second bipartite rod carried by the gate, said second rod being positioned in the vicinity of the top of the gate and having its ends normally seated in aligned recesses formed in the truck side members, means operatively associated with each of said bipartite rods for moving the rod ends into or out of seated positions with respect to the recesses, whereby the gate may be selectively released for pivotal movement about either of the rods, a trackway secured to the rear face of the endgate and extending transversely thereof, a truck loader supporting frame slidably mounted on said trackway, a pair of jacks, including jack pistons, pivotally mounted on said support frame, a scoop boom pivotally attached at one end to the end of one of the jack pistons, an open-ended scoop pivotally mounted at the opposite end of the boom, the piston of the other jack being pivotally attached to the boom between the boom ends, said scoop having a bottom member, a curvilinear back portion extending upwardly and forwardly of the bottom member, and a top flap pivotally mounted at the front of said back portion, a tie rod having one end pivotally secured to the flap, the opposite end of the rod being pivotally mounted in the vicinity of the end of the jack piston attached to the boom between the boom ends, a source of power to actuate the jacks, and means associated with each jack for controlling inward and outward movement of the jack piston, whereby upon suitable manipulation of the control means the scoop moves outwardly to loading position and then upwardly in a circular path to unloading position.

References Cited in the file of this patent

UNITED STATES PATENTS

| | | |
|---|---|---|
| 2,344,755 | Venard | Mar. 21, 1944 |
| 2,388,015 | Shoemaker | Oct. 30, 1945 |
| 2,480,959 | Presnell | Sept. 9, 1948 |
| 2,609,951 | Daniels | Sept. 9, 1952 |
| 2,641,370 | Pherson | June 9, 1953 |
| 2,645,522 | Kersey | July 14, 1953 |
| 2,774,496 | Dorkins | Dec. 18, 1956 |
| 2,777,593 | Nelson | Jan. 15, 1957 |

FOREIGN PATENTS

| | | |
|---|---|---|
| 486,110 | Canada | Feb. 8, 1950 |